June 28, 1966 G. F. SCOTT 3,258,349
LIGHT POROUS REFRACTORY BRICK AND METHOD
Filed May 11, 1962

INVENTOR.
GEORGE F. SCOTT
BY
Rufus M. Franklin
ATTORNEY

United States Patent Office 3,258,349
Patented June 28, 1966

3,258,349
LIGHT POROUS REFRACTORY BRICK
AND METHOD
George F. Scott, West Boylston, Mass., assignor to Norton Company, Worcester, Mass., a corporation of Massachusetts
Filed May 11, 1962, Ser. No. 193,941
10 Claims. (Cl. 106—41)

This invention relates to refractory products of very high porosity.

It is an object of this invention to provide an insulating brick or other shape of high purity, low density, and good insulating and temperature resistant properties, combined with adequate strength.

It is a further object to provide a method for producing bricks or other shapes having the above characteristics.

Another object of the invention is to produce a highly porous refractory shape having a novel structure of inosculating hollow particles.

Th above and other objects are attained by the production of a highly porous well sintered refractory shape having high strength porous structure. The refractory shapes produced by this invention are superior in the combined properties of refractoriness, lightness, and strength than any previously produced refractory articles of which the applicant is aware.

The invention is concerned with a refractory shape which is composed of interconnected hollow particles and with the method of making such shapes.

The shapes of this invention contain three types of pores, namely—the closed pores represented by the hollows in the particles, small pores in the hollow particle walls, and interparticular pores which are the pores between the hollow particles.

The invention will now be more particularly described with reference to the accompanying drawing in which.

Figure 1:
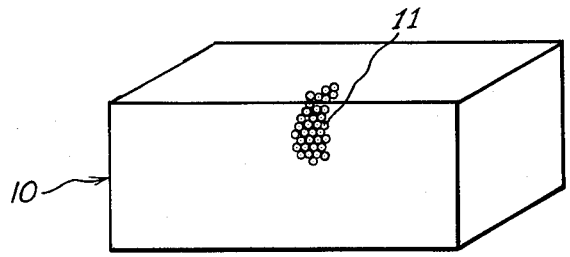
FIG. 1 is a perspective view of a refractory brick made according to the invention.
Figure 2:
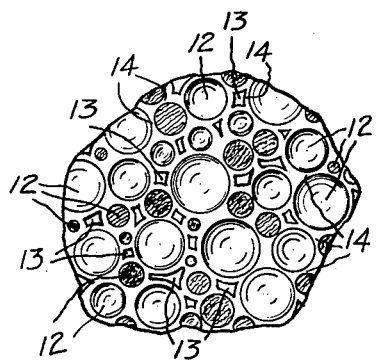
FIG. 2 is an enlarged partial view of the surface of a cut section taken any place through the structure indicated in FIG. 1.

Referring specifically to FIG. 1, the brick 10 is formed of hollow spheriodal particles 11, joined together to form a rigid shape. As shown more particularly in FIG. 2, in the enlarged section, there are hollows 12 in the particles 11, and interparticulate pores 13 between the particles 11. In addition, too small to be seen in the drawing are small pores in the particle walls 14. As is evident from the drawings, the pores 12 are not anastomosing while the pores 13 are likely to be anastomosing.

In the process of this invention, refractory powders with suitable liquids and binders are mixed with a calculated volume of organic particles. The volume of particles and the consistency of the mixture is controlled so that a thin layer of the mixture of powder, liquid and binder surrounds each particle. This condition can be noted by observation. The mixture is then placed in a mold, and formed under vibration or very light pressure to prevent distortion of the organic particles or destruction of the interparticulate pores during the forming operation. The formed shape is removed from the mold and dried. At this point the shape can be inspected to determine that it contains interparticulate pores. If not, the molding pressure was too great or the consistency of the mix must be corrected. It is then fired to remove the organic particles by melting, dissociation, volatilization or burning and to sinter the refractory powders together to a unsable strength.

Since the particles of organic material disappear during the firing operation, there is formed a continuous structure of hollow particles. The solid portion of the structure is physically and chemically homogeneous with no variation in composition between particles.

When solid spheres of the same size are packed together, they will occupy 62.5% ("Mechanical Packing of Spherical Particles" by R. K. McGeary, Journal of American Ceramic Society, p. 514, October 1961) of the available space leaving 37.5% of interspherical pores. Therefore, the maximum pore volume for the hollows of the particles of this invention is 62.5%. Since the hollows of the particles are not interconnecting, and since the particles must have a finite wall thickness, the maximum volume for the hollows must be below 62.5% of the total product volume.

If a limiting case is chosen in which the hollow diameter is as great as 25 times the particle wall thickness, then the ratio of particle volume to hollow volume is 1.26. In this case, if the particles occupy as much as 62.5% of the product volume, the hollows can be a maximum of 49.5% of the product volume. To have usable strength the porosity of the wall should not be much above 30%. If there were no interparticular pores, then the total porosity (with a particle volume to hollow volume ratio of 1.26 and a wall porosity of 30%) would be 65%. With a total porosity greater than 65%, there would have to be interparticular pores. The product of my invention contains all three types of pores and its total porosity therefore is at least 65%.

As a practical matter any refractory shape produced by following the teachings of this invention will include at least about 5% porosity in the form of interparticulate pores. Therefore the actual porosity of the refractories produced by this invention will range from about 70% to an upper limit of about 97%. Although I can produce shapes of 97% porosity having a crushing strength of 50 pounds per square inch, even weaker shapes are of value. For example, with a crushing strength of only 10 pounds per square inch, refractory bricks having a density of 0.5 could be piled in a wall about 60 feet high without the bottom bricks being crushed by the weight of those above them.

The organic particles should be of such size that the hollow particles making up the fired refractory shape should be no larger than .25 inch in their largest dimension and no smaller than .01 inch. This means that allowing for shrinkage in firing the organic particles should be less than about .30 inch and greater than .01 inch in the largest dimension.

It is desirable that the particles be spheroidal in shape, but shapes generally approaching the spherical may be employed. Thus irregular shapes such as ground cork may be employed. The use of polystyrene beads in this invention is particularly advantageous. The beads are readily obtainable commercially, closely approximate spheres, and burn away completely leaving less than 1% inorganic residue. Although the examples show the use of uniformly sized beads, it is possible to achieve good results by mixing one or more sizes of beads.

In the process of my invention a composition is required which will give a strong wall or the product will be weak. A wide variety of compositions can be used to make the product of my invention. To indicate the variety of products which can be made, the following examples are cited.

*Example 1*

| | Parts by weight |
|---|---|
| Calcined alumina —325 mesh | 94 |
| $Al_2(OH)_5Cl \cdot 2.5H_2O$ | 6 |
| Water | 15 |
| 2% methyl cellulose solution | 12 |
| Expanded polystyrene beads .1" diameter (2#/ft.³) | 12 |

The aluminum oxychloride is dissolved in water and then mixed with the methyl cellulose solution. The alumina powder is stirred into this solution to form a paste with a smooth creamy texture. Next, the polystyrene beads are combined with the paste. The consistency of the mixture is controlled so that the beads are surrounded with a coating of the paste. The mixture is then scooped into a mold and pressed to shape at a pressure of only a few pounds per square inch. Only enough pressure is used to form the shape. As previously noted, higher pressures are not desired, first because they deform the beads, and second, because higher pressures cause the paste to be extruded out between the beads to fill the interparticular pores. Deformation of the beads during pressing can also cause cracking of the shape as the compressed beads relax after pressing.

Although polystyrene beads were used in this example, other materials have been used successfully in their stead, materials such as cork, seeds, walnut shells, and paradichlorobenzene.

The formed shape is removed from the mold and dried. The shape is then fired to 1750° C. in a combustion atmosphere kiln. During this firing the beads burn out leaving pores in their place. The aluminum oxychloride decomposes leaving a fine active alumina powder behind interspersed in the calcined alumina to aid in the sintering of the alumina. The calcined alumina sinters together to produce strong thin walls. After the above procedure, a product is produced with a total porosity of 94% and a crushing strength of 75 pounds per square inch.

Examination of the fired product showed it consisted of interconnecting hollow spheres with interparticular pores. The size of the hollow pores was about .09 inch and the diameter of the hollow particle was about .1 inch.

The firing temperature used depends on a number of factors. If the product is to be used near the melting point of the product, then a high firing temperature is required to minimize shrinkage in use. If the product will be used at lower temperature, for example 1000° to 1500° C., then the lower firing temperature such as 1450° can be used successfully. However, with a lower firing temperature to obtain adequate strength, it is desirable to use calcined alumina of a finer particle size such as −900 mesh material.

*Example II*

| | Parts by weight |
|---|---|
| Calcined alumina (−325 mesh) | 99 |
| Colloidal alumina | 1 |
| Water | 16 |
| 2% methyl cellulose solution | 12 |
| .1″ diameter expanded polystyrene beads (2#/ft.³) | 3 |

The colloidal alumina was mixed with water and then the procedure followed as in Example I. This product had a total porosity of 70% and a crushing strentgh of 260 p.s.i.

A cross section was cut through this shape. A straight line was drawn at random across this cross section. The way dimensions and distances across the hollows and interparticular pores were then measured. The average dimension of solid material on this linear cross section was .062 inch. The average distance across the pore along this linear cross section was .084 inch. Pores were also observed within the particle wall, but these were usually a small fraction of the wall thickness and these pores were not included in the above linear measurements. The connections between the hollow particles were chemically and physically homogeneous from one particle to the next.

The methyl cellulose solution is used in this mixture to make the solutions more viscous and to give the body adequate green and dry strength. Other organic binders can be substituted.

| | Parts by weight |
|---|---|
| Fused unstabilized zirconia (average particle size 5 microns) | 20 |
| Fused stabilized zirconia (average particle size 5 microns) | 40 |
| Fused stabilized zirconia (average particle size 44 microns) | 20 |
| Zirconium oxychloride | 4 |
| Water | 5 |
| 2% methyl cellulose solution | 6 |
| .1″ diameter polystyrene beads at 2#/ft.³ | 4 |

The oxychloride is dissolved in water and then mixed with the methyl cellulose solution. The zirconia powders are mixed in to form a paste. Beads are added and mixed in. A shape is formed dried, and fired in the manner described in Example I. A zirconia shape is formed having a total porosity of 80% and a crushing strength of over 500 pounds per square inch.

*Example IV*

| | Parts by weight |
|---|---|
| Silicon powder (5 microns and smaller) | 24.2 |
| 2% methyl cellulose solution | 13.7 |
| .06″ diameter polystyrene beads (1.44#/ft.³) | 2.1 |

Those ingredients are mixed together. The mixture is placed in a 3½″ diameter round cardboard mold and vibrated while being pressed by hand pressure using a flat plate. The pressed piece is air dried for 3 hours and then dried in an oven overnight at 175° C. A nitrogen atmosphere is used to fire the shape. The firing cycle is six hours to 600° C., 1 hour at 600° C. for burning off beads, 8 hours to 1390° with a 10 hour soak to convert the silicon to silicon nitride and form a bond. This firing formed a product consisting of 86% $Si_3N_4$ and 14% silicon which in these proportions have a theoretical density of 3.3 g./cc. The product formed had a bulk density of .44 g./cc. which corresponds to a total porosity of 87%. Crushing strength of this product is 360 pounds per square inch.

A piece of this refractory was impregnated with a resin and then cut to obtain a cross section. A straight line was drawn at random across this cut surface. Measurements were then made along this line with a binocular microscope. Along this line the pores and solid material alternated and the length of each portion was measured. No distinction was made in the measurement between interparticular pores and hollows. The average length of solid material along this linear cross section was .021″ and the average length of pore was .05″.

*Example V*

| | Parts by weight |
|---|---|
| Silicon carbide powder (3 micron average size) | 65 |
| 2% methyl cellulose solution | 8 |
| Water | 27 |
| .06″ diameter polystyrene beads | 7 |

The silicon carbide powder is added to the liquids in a mixer and mixed to impart a sticky, almost taffy-like consistency. The beads are added and mixed to form a homogeneous mixing. Molding and drying are similar to the procedure described in Example I. The shape is then fired in a reducing carbonaceous atmosphere to 1800° C. with 15 minute soak at temperature. The density of this product is 0.5 g./cc. and thus its total porosity is 84%. The crushing strength is 380 pounds per square inch.

What is claimed is:

1. A refractory shape having a total porosity of 70 to 97%, and a melting point above 1400° C., said shape consisting substantially of interconnecting hollow particles between .01 and .25 inch in diameter with interparticular pores between the hollow particles, and with the average wall thickness of said particles as measured by a linear cross section being less than the average distance across said interparticular pores and pores of the hollows, and with the interconnections between particles being structurally and chemically the same as the particle walls.

2. A refractory shape as in claim 1 in which said particles consist essentially of aluminum oxide.

3. A refractory shape as in claim 1 in which said particles consist essentially of zirconia.

4. A refractory shape as in claim 1 in which said particles consist essentially of silicon nitride and a minor portion of silicon.

5. A refractory shape as in claim 1 in which said particles consist essentially of silicon carbide.

6. A refractory shape as in claim 1 in which said particles consist essentially of refractory metal oxide.

7. A method of forming a refractory shape comprising mixing a refractory powder with a binder, a particulate organic material, and a liquid whereby a coating of refractory powder is formed around each organic particle, forming the mixture to shape in a mold whereby pores are maintained between adjacent coated organic particles, firing said mixture whereby said organic material is removed from the mixture and the mixture is converted into a refractory shape having a total porosity greater than 65%.

8. A method as in claim 7 wherein said organic material comprises spheroidal particles.

9. A method as in claim 7 in which the refractory shape is formed by molding under light pressure.

10. A method as in claim 7 in which the refractory shape is formed by vibrating the mix in a mold.

References Cited by the Examiner
UNITED STATES PATENTS

| | | | |
|---|---|---|---|
| Re. 22,997 | 5/1948 | Kinzie | 106—41 |
| 2,553,759 | 5/1951 | Geiger | 106—41 |
| 2,636,825 | 4/1953 | Nicholson | 106—44 |
| 2,921,859 | 1/1960 | Godron | 106—41 |
| 2,996,389 | 8/1961 | Fernhof | 106—41 |
| 3,085,886 | 4/1963 | Grandey | 106—41 |
| 3,097,930 | 7/1963 | Holland | 106—41 |

TOBIAS E. LEVOW, *Primary Examiner.*

MAURICE A. BRINDISI, *Examiner.*

H. McCARTHY, *Assistant Examiner.*